Figure 1:
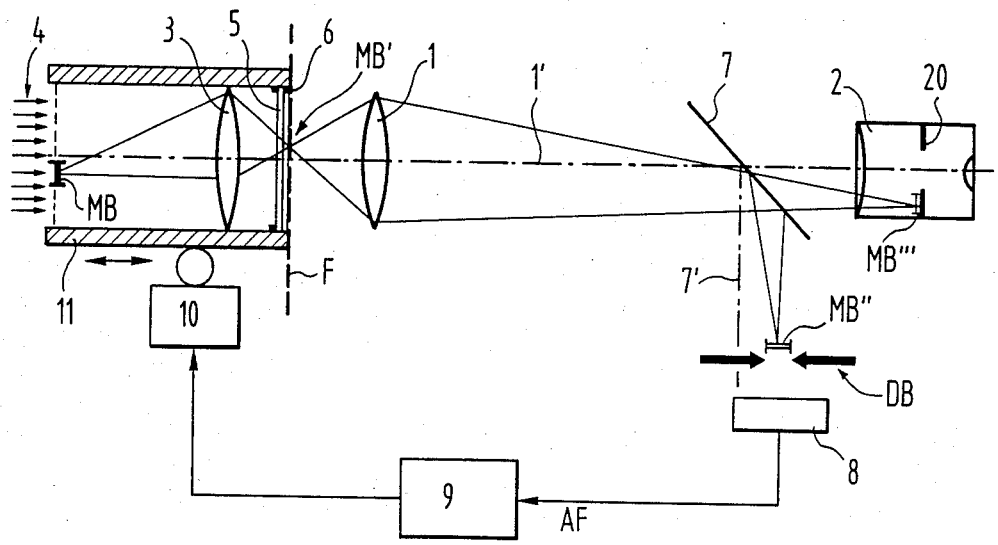

United States Patent [19]

Gorgon

[11] Patent Number: 4,686,360

[45] Date of Patent: Aug. 11, 1987

[54] DEVICE FOR THE AUTOMATIC FOCUSSING OF OPTICAL INSTRUMENTS WITH COMPLEMENTARY MEASURING AND DETECTING DIAPHRAGMS

[75] Inventor: Georg Gorgon, Puchheim, Fed. Rep. of Germany

[73] Assignee: Karl Süss KG, Präzisionsgeräte für Wissenschaft und Industrie GmbH & Co., Garching, Fed. Rep. of Germany

[21] Appl. No.: 666,986

[22] Filed: Oct. 31, 1984

[30] Foreign Application Priority Data

Nov. 4, 1983 [DE] Fed. Rep. of Germany ....... 3339970

[51] Int. Cl.⁴ .............................................. G01J 1/20
[52] U.S. Cl. ....................................... 250/201; 356/4
[58] Field of Search ...................... 250/201 AF, 204; 354/402, 403, 406; 356/4

[56] References Cited

U.S. PATENT DOCUMENTS

| 3,721,827 | 3/1973 | Reinheimer | 250/201 |
| 3,967,110 | 6/1976 | Rogers et al. | 250/578 |
| 4,153,834 | 5/1979 | Hayamizu | 250/201 |
| 4,460,258 | 7/1984 | Fukuhara | 354/402 |

Primary Examiner—David C. Nelms
Assistant Examiner—S. Allen
Attorney, Agent, or Firm—Parmelee, Bollinger & Bramblett

[57] ABSTRACT

For the automatic focussing of an optical instrument on an object, a measuring diaphragm is inserted into the illuminating radiation path, which diaphragm is to be projected onto the object plane and focus plane during focussing. This intermediate image of the measuring diaphragm is projected via a detector diaphragm which is complementary to the measuring diaphragm, onto a detector, the output signal of which is a scale for the quality of the focussing and which acts on a focussing drive in the sense of optimum focussing via a control device.

26 Claims, 8 Drawing Figures

DEVICE FOR THE AUTOMATIC FOCUSSING OF OPTICAL INSTRUMENTS WITH COMPLEMENTARY MEASURING AND DETECTING DIAPHRAGMS

The invention relates to a device for the automatic focussing of optical instruments, particularly of microscopes, in accordance with the precharacterising clause of claim 1.

From German Auslegeschrift No. 2,234,448, such an autofocussing device for microscopes is known in which a photoresistance, which is arranged in the imaging radiation path of the optical instrument, sends a signal to a circuit, said signal having a peak value at maximum focussing. This autofocus signal is used for controlling the drive which generates the relative movement between the object plane and the focus plane. In this arrangement the focusing, i.e. the conformity of object plane and focus plane, results from the peak value of the autofucus signal. The autofocus signal itself is obtained directly from the image of the object, i.e. the change in brightness of the object image is directly determined as a function of the degree of focussing and used as the autofocus signal. To improve the test result, the focussing-independent brightness value is determined as a reference value via a further photodetector covered by a diffusing ground glass.

From German Auslegeschrift No. 2,442,167 a device for the automatic focussing of microscopes is also known in which a laser beam is reflected into the microscope via the vertical illuminator and is focussed in said vertical illuminator. This point of laser light is accurately imaged by the objective onto its focus plane which should coincide with the object plane. If the object plane, however, is not located on the focus plane, the point of light on the object plane blurs into a more or less large spot. If in this known device the spot of laser light falling onto the object is set for the smallest diameter, this also focusses the object in the microscope.

In the intermediate image plane, where the image of the object appears, a small-area photodetector measures the brightness in the image of the spot of laser light. Low brightness means that the tight spot is large and the microscope is thus out of focus. At maximum brightness, the light spot is smallest which indicates that the setting is in focus. For automatic focussing, an electronic analog circuit controls the motor which adjusts the height of the microscope stage until the photodetector receives maximum brightness. This known device is relatively elaborate as it needs a laser.

In contrast, the main aim of the inventions is to provide a simple automatic focussing device which, nevertheless, works accurately.

In order to achieving this aim, the invention was based on the concept of coupling the image of a measuring diaphragm, for example by reflection, into the main radiation path of the optical instrument, for example via the conventional illuminating device. In this arrangement, the measuring diaphragm is arranged and, if necessary, moved during the focussing in such a way that, when it is set to be in focus, an intermediate image of the measuring diaphragm lies on the object plane and one to the focussing, also on the focus plane. This intermediate image of the measuring diaphragm is then scanned at a suitable location in the optical instrument by means of suitable detectors, if necessary with the assistance of detector diaphragms. The output signal of the detector is produced during the focussing movement of the autofocus device. This signal is fed into a control device as a so-called autofocus signal which passes through the focus plane. The control device regulates the drive for the focussing movement between the object and the optical instrument. The control device recognises that the peak value of the autofocus signal is the in-focus position.

Thus, the principle of the invention consists of generating, in the focus plane, an artificial contrast which has a well-defined, shape, which is used to control the focussing movement. Contrary to this, a certain minimum contrast on the object in required in the known autofocus systems.

The invention is particularly characterised by the features of the patent claims. Thus, a measuring diaphragm is imaged, via a measuring beam, (said beam being for example, a part of the illuminating radiation of a conventional illuminating device of the microscope) into the radiation path of the optical instrument in such a way that an intermediate image of the measuring diaphragm is located on the object plane, and thus also on the focus plane, in the in-focus position. This intermediate image of the measuring diaphragm is then imaged again via the main radiation path of the optical instrument together with the object and is scanned there by a detector arrangement suitable for analysing the quality of focussing. In order to simplify or facilitate the arrangement of the detector, at least the part of the radiation which images the measuring diaphragm can be decoupled from the main radiation path by means of a partially transparent mirror and can thus be imaged onto a detector which is arranged outside the main radiation path.

In the simplest embodiment, a detector diaphragm is arranged in front of the detector and is constructed to be complementary to the measuring diaphragm, for example in the form of a hole diaphragm with a masking-type measuring diaphragm.

When the optical instrument is then focussed on the object, an autofocus signal is obtained in the scope of of the invention at the output of the detector. Said autofocus signal has a peak value when the object plane passes through the focus plane of the optical instrument. The control device for the focussing drive optimizes its operation to said peak value. Alternative illustrative embodiments of the detector diaphragm and detector combination will be explained further below by giving examples.

The autofocus device according to the invention uses simple means to obtain a very accurate automatic focus setting which also meets high demands on the adjusting accuracy of the object holder, or object slide even with very small depths of focus of the optical instrument. Thus, for example, adjustment accuracies of the object holder as regards the optical instrument of the order of magnitude of 0.2 $\mu$m and less are quite easily possible. In addition, no additional illuminating device, for example in the form of a laser, is required since the conventional illuminating device of the optical instrument can be used by simply inserting an appropriately shaped measuring diaphragm into a suitable location in the illuminating radiation path, particularly the plane of the field diaphragm, or a plane which is conjugated to that.

In order to ensure an unimpaired field of view of the optical instrument, the measuring diaphragm is preferably laterally offset as regards the optical axis of the instrument, if possible to such an extent that its image lies outside the field of vision.

As previously indicated, a beam splitter, for example in the form of a partially transparent mirror, can be arranged in the main radiation path of the optical instrument between the objective and the eyepiece, in order to decouple the beam containing the image of the measuring diaphragm from the main radiation path and to project it onto the measuring arrangement, consisting of detector diaphragm and detector, for generating an autofocus signal. This simplifies the detector construction, possibly including a down-stream detector diaphragm, as spatial limitations caused by the main radiation path and especially by the eyepiece are largely eliminated.

In the text which follows, two alternative illustrative embodiments of optical instruments are explained which differ in their conventional object illumination, one being carried out with transmitted light and the other with incident light, respectively.

When illumination is carried out with transmitted light (in which method the illuminating beam is radiated through the object into the objective of the optical instrument at an essentially coaxial angle to the optical axis), the measuring diaphragm according to the invention is advantageously arranged in the beam direction in front of the condenser of the illuminating device, said condenser is in turn, located in the beam direction in front of the (transparent) object holder. To prepare the automatic focussing, the first intermediate image of the measuring diaphragm is first firmly preset to the intended object plane by means of the condenser. Object, object holder, condenser and measuring diaphragm can be jointly moved in the direction of the optical axis via the drive. Their mutual spacing relative to the optical instrument, for example the microscope is retained.

The intermediate image of the measuring diaphragm, said image being located in the object plane, is only focussed via the optical instrument on the detector diaphragm when object plane and focus plane are coincident. During the relative movement effectd by the drive, the autofocus signal of the detector then passes through a peak value to which the focussing arrangement automatically adjusts itself.

If the optical instrument is operated with incident light, the measuring diaphragm is also preferably inserted into the illuminating radiation path in front of the condenser lens so that an intermediate image is produced on the focus plane of the optical instrument. If the object plane is also located in the focus plane, the intermediate diaphragm image is reflected by the object plane and focussed onto the detector diaphragm. This means that the autofocus signal of the detector assumes the peak value. In the case of defocussing however, i.e. if the object plane is displaced from the focus plane, the intermediate diaphragm image lands defocussed on the object plane. It is reflected there and imagined onto the detector diaphragm with corresponding lack of focus. The autofocus signal of the detector then deviates from the peak value. The drive for the object holder is then controlled relative to the optical instrument with the aid of the autofocus signal in the manner previously explained.

As discussed above, the measuring diaphragm can be constructed as a hole diaphragm or as a masking diaphragm and the detector diaphragm can be constructed as a masking diaphragm or hole diaphragm which is complementary to the former. It is also possible to construct the measuring diaphragm as a unilateral diaphragm so that the detector diaphragm is also suitably constructed as complementary unilateral diaphragm.

In a preferred embodiment, the measuring diaphragm is constructed as an azimuthal diaphragm as regards the field of vision. In this arrangement, the detector diaphragm consists of two detector diaphragm sections, the azimuthal spacing of which corresponds to the width of the measuring diaphragm image at the location of the detector diaphragm. Such azimuthal diaphragms have the advantage that no chromatic aberrations occur, whilst with radial diaphragms, i.e. if the diaphragm edges are radially spaced, the chromatic aberration increases towards the edge of the lens.

In order to be able to determine in which direction the focussing movement must take place according to the relative position between the object plane and the focus plane, it is necessary, when using a detector diaphragm to first carry out a test movement in order to determine the direction in which the autofocus signal peak value wanted is located. If during this test movement the autofocus signal does not change in the direction of the peak value, the focussing movement must be reversed.

This test movement becomes unnecessary if preferably several detector diaphragms arranged in different image planes and their corresponding detectors are used, the different autofocus signals of which provide the required direction of the focussing movement, i.e. the necessary adjusting direction.

According to the invention, the control device controlling the adjusting movement has a controllable amplifier which amplifies the autofocus signal, and an analog or digital computer for the further processing of the amplifier autofocus signal and the generating of the adjusting signal for the drive. In this arrangement, a control signal for the amplifier is preferably generated by the computer in order to always obtain the same autofocus signal even in different conditions of illumination or fluctuating reflectivities of the objects. The actual intensity is measured via a reference probe located in the intermediate image plane or via the focussing detector if the actual focussing process has not taken place; the reference signal obtained in this manner is used for amplifying the output signal of the amplifier to a reference value.

For further averaging of measuring errors, several particularly similar, measuring diaphragms can be used (according to the invention) in corresponding planes so that a corresponding number of measuring diaphragm images are also imaged onto associated detector diaphragms and corresponding detectors. This provides several autofocus signals which, after suitable evaluation, are fed as measurement signals to the control device for the drive.

As an alternative to the respective detector diaphragm, two closely adjacent detectors can also be used. Said detectors essentially carry out a contrast measurement at the edge of the measuring diaphragm image concerned by means of a differentiation of their output signals. In this case, maximum contrast means optimum imaging of the measuring diaphragm and thus focussing of the optical instrument as regards the object.

Figure 2:
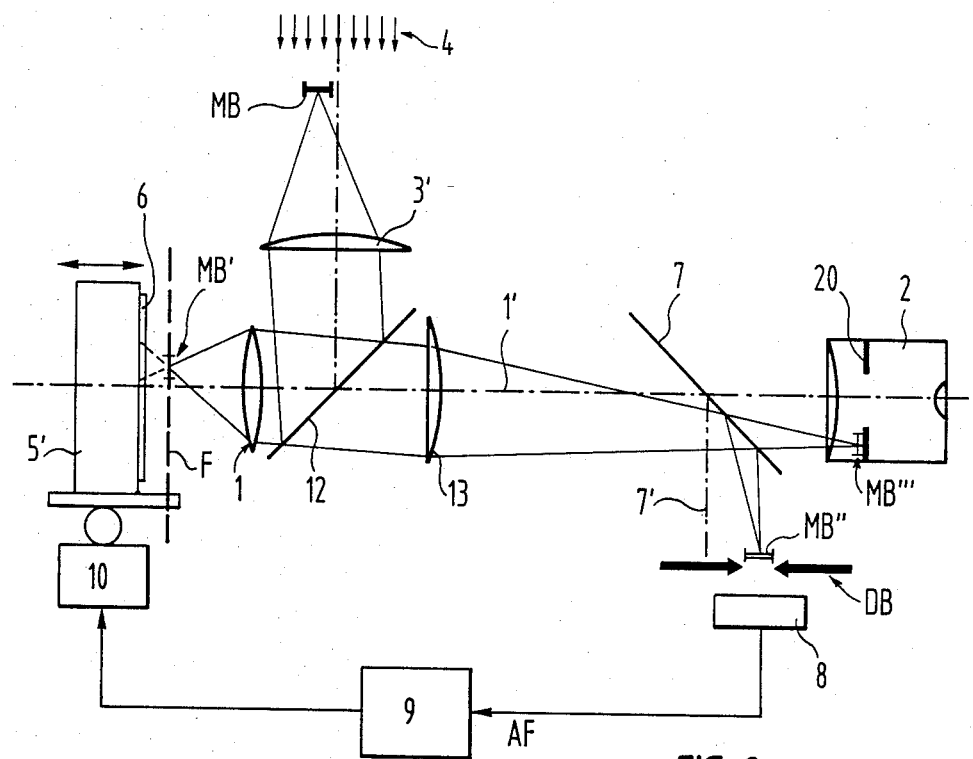
Figure 3:
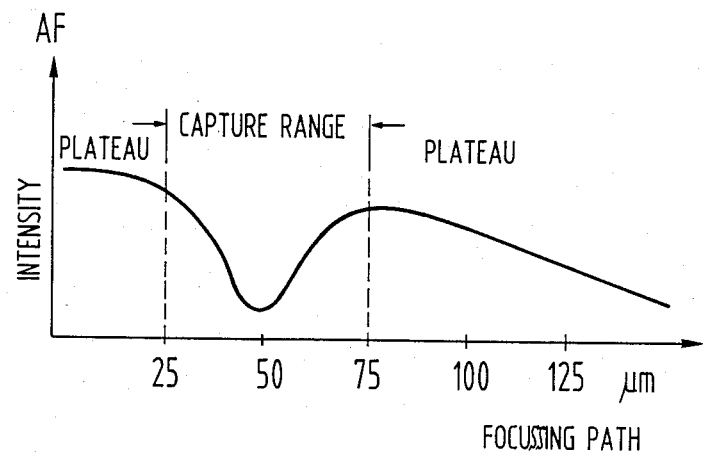
Figure 4:
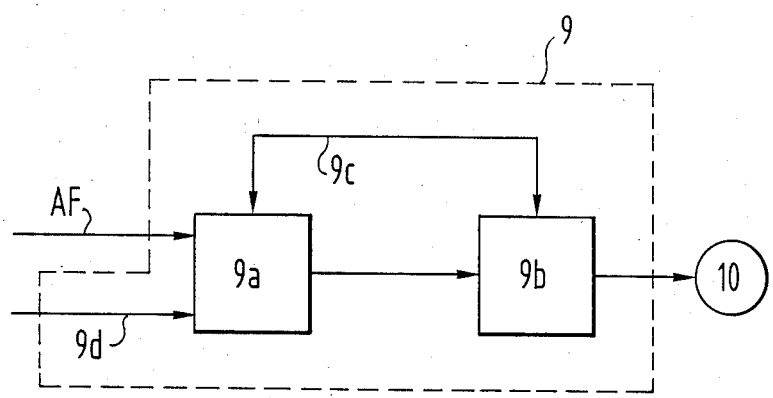
Figure 5A:
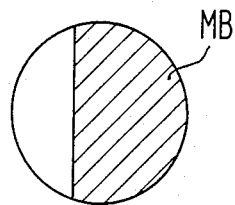
Figure 5B:
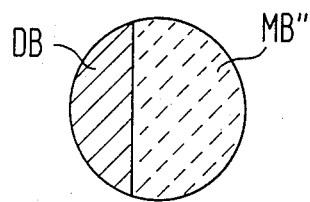
Figure 6:
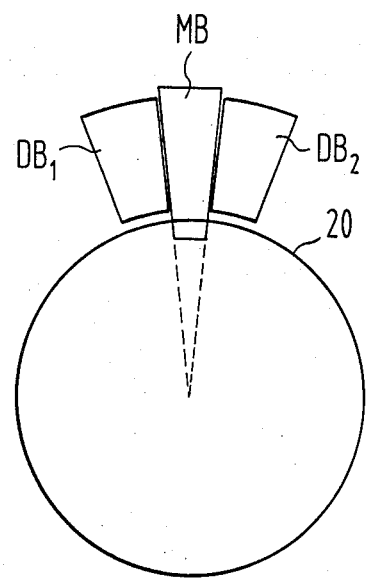
Figure 5C:
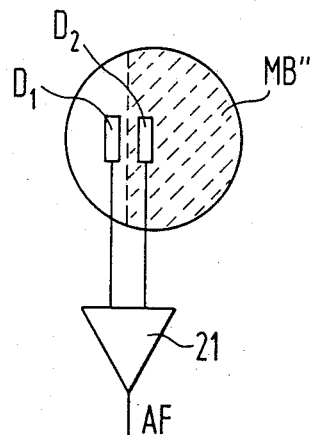

In the text which follows, the invention is explained in greater detail by referring to the diagrams in which:

FIG. 1 shows a diagrammatic representation of a first embodiment according to the invention in a transmitted-light microscope, FIG. 2 shows a diagrammatic representation of a second embodiment in an incident-light microscope, FIG. 3 shows a graphic representation of the autofocus signal, FIG. 4 shows a block diagram of the control device, FIG. 5 shows diagrammatic representations of 5(a) a unilateral measuring diaphragm, 5(b) a unilateral detector diaphragm which is complementary to FIG. 5a and 5(c) an alternative to the detector diaphragm, comprising two closely adjacent detectors for contrast measuring purposes, and FIG. 6 shows a diagrammatic representation of the field of view, comprising measuring diaphragm and complementary detector diaphragm.

In the following description, the invention is explained particularly in connection with microscopes, but the automatic focussing device according to the invention can also be used in other optical instruments accordingly.

The transmitted-light microscope shown in FIG. 1 has an objective lens 1 and an eyepiece 2 having a common optical axis 1'. The object 6 is illuminated via a parallel illuminating beam 4 which is focussed by a condenser 3 for illuminating said object 6. The object 6 is held by a transparent object holder 5, in a defined position relative to the condenser 3 is such a way that the object plane to be observed with the microscope is located on the focal plane of the condenser 3. The illuminating beam is also used to image a measuring diaphragm MB, arranged in the radiation path in front of the condenser 3, onto the focal plane of the condenser 3, i.e. onto the object plane. This intermediate image MB' of the measuring diaphragm MB is used for automatic focussing purposes.

In FIG. 1, the object plane is already located on the focus plane F of the microscope, i.e. the microscope is already focussed on the object 6. In this position, the intermediate image MB' of the measuring diaphragm MB is imaged by the objective 1 into the eyepiece so that another intermediate image MB''' is obtained at that point. In order to prevent the measuring diaphragm and its images from impairing the field of view (as far as this is possible), said measuring diaphragm is laterally offset as regards the optical axis 1' so that the intermediate image MB''' falls onto the field diaphragm in the eyepiece, i.e. it lies outside the field of view. Between the objective 1 and the eyepiece 2, a semi-transparent mirror 7 is arranged as a beam splitter in order to decoupled a part of the image beam from the main radiation path of the microscope and to direct it to a detector diaphragm DB. This detector diaphragm DB is dimensioned and arranged in such a way that the part of the intermediate imabe MB'' of the measuring diaphragm MB deflected by the mirror 7 is just masked by the detector diaphragm DB, which is complementary to said measuring diaphragm MB when the microscope is focussed on the object. As a result of the offset arrangement of the measuring diaphragm MB as regards the optical axis 1', the detector diaphragm DB is also offset as regards the secondary otpical axis 7' deflected by the mirror 7.

A photodetector 8 which generates an autofocus signal AF as a function of the light penetrating the detector diaphragm DB is arranged behind said detector diaphragm DB.

This autofocus signal AF is essentially proportional to the incident light intensity.

If the microscope is defocussed as regards the object 6, perhaps by jointly displacing the measuring diaphragm MB, the condenser 3, the object holder 5 and the object 6 to the right, and these components are then displaced to the left again past the focus plane F, the autofocus signal AF illustrated in FIG. 3, is obtained as a function of the focussing path. If the object 6 is too close to the objective 1, the intermediate image MB' of the measuring diaphragm MB, which is constructed as a masking diaphragm, is not located on the focus plane F of the microscope. Also the image MB'' of the measuring diaphragm MB obtained on the detector diaphragm DB is not sharply focused but greatly blurred. This causes light to pass through the hole diaphragm DB and the intensity of the autofocus signal at the detector 8 is relatively high. If the object 6 approaches the focus plane F, the image MB'' of the measuring diaphragm MB becomes increasingly sharper in the hole diaphragm DB so that the autofocus signal of the detector 8 decreases and finally assumes a minimum when focussed. As the movement of the object 6 progresses away from the lens 1 towards the left-hand side in FIG. 1, the image MB'' at the hole diaphragm DB becomes blurred again as a result of defocussing and the autofocus signal AF increases again. In FIG. 3 this autofocus signal AF goes through a maximum on the right next to the minimum in the curve, this maximum corresponding approximately to the virtually undisturbed illumination of the detector 8 in the case of severe defocussing.

If the object and the illuminating device are displaced even further to the left as regards the objective and in the case of constant defocussing the autofocus signal falls in the region of the so-called "plateau" as the brightness decreases as a square of the distance from the light source.

According to FIG. 1, the autofocus signal AF of the detector 8 is supplied to the control device 9 which controls a drive 10 for moving a holder or tube 11 in the direction of the optical axis 1' relative to the microscope. In this holder 11, the measuring diaphragm MB, the condenser lens 3, the transparent object holder 5 and the object 6 are held in such a way that the intermediate image MB' of the measuring diaphragm MB is located in the object plane when the measuring diaphragm is illuminated.

The control device 9 responds to the autofocus signal AF in such a way that it assumes the peak value (in FIG. 3 the minimum of the curve in the capture range by which one generally means the range in which the system "recognises" the direction for the focussing movement (i.e. within the plateau boundaries in the surroundings of which the contrast of the measuring diaphragm image disappears)) by activating the drive 10 for the relative movement of the holder 11 as regards the microscope.

For this purpose, the control device 9 first causes a test movement of the holder 11 to occur, for example by increasing the distance to the objective, in order not to damage it. The control device can then determine whether during this test movement the autofocus signal AF increases or decreases and thus whether the focussing position is located to the right or to the left of the minimum of the signal curve in FIG. 3. On the basis of this result, the control device then decides whether the drive movement can be maintained or must be reversed in order to reach the minimum, i.e. the focus position.

Focussing has been achieved when, in the case of progressive movement, the signal change becomes zero and changes the sign, i.e. when the signal differential passes through zero. When this zero transition is reached, the drive 10 is stopped.

As mentioned above, the minimum of the autofocus signal corresponds to the focus plane. The autofocus-control can then perform so-called control-oscillations around this point. As due to the high sensitivity of the eye vis-a-vis intensity variations, these controloscillations are almost always visible, the autofocus-control should be stopped. The stopping and starting of the control respectively may be performed according to the following possibilities:

stopping condition: The control is stopped if the motor has changed the drive direction N times;

starting condition: the control is started again if the detector measuring the autofocus signal detects an intensity-change ΔI. This intensity-change is due to a defocussing of or a change in the reflectivity of the object surface.

Both, N and ΔI are detected and used for further calculations by the analog or digital computer controlling focussing.

If at the beginning of the focussing movement, the object is located far outside the focus plane F, i.e. outside the so-called capture range (on the right in FIG. 3), the control device 9 can recognise, that this is not the left-hand falling part of the signal curve in the capture range because of the low signal rise in the plateau region.

From this the control device 9 deternines that initially a relatively large movement of the holder 11 in the direction of the microscope is needed to reach the capture range. The mode of operation of the control device 9, described generally and functionally above, allows for a large number of different details of the circuit for the control device itself. However, this is known to the expert so that closer details concerning this circuit can be omitted. In particular, the control device can process the signals in analog or digital or also mixed techniques.

Compared with FIG. 1, FIG. 2 essentially differs in that the microscope is operated with incident light, i.e. the object plane is illuminated from the direction of observation of the microscope. For this purpose, the illuminating beam 4 is reflected between the objective lens 1 and a tubular lens 13 via an illuminating condenser 3′ and a partially transparent mirror 12 at approximate right-angles to the optical axis 1′ into the main radiation beam of the microscope.

This illuminating condenser 3′ should preferably have the same or similar optical characteristics (quality and so forth) as the tubular lens 13. This condenser illuminates the focus plane F of the microscope; the measuring diaphagm MB located in the radiation path of the illuminating beam 4, is thus imaged into the focus plane F of the microscope and the intermediate image MB′ is obtained at that point. The measuring diaphragm MB is offset as regards the optical axis 1′ for the same reasons as in FIG. 1.

If, as shown in FIG. 2, the object 6 (which may be opaque) located on the object holder 5′ is not located in the focus plane F of the microscope, for example on the left of the latter, an unsharp image of the measuring diaphragm MB is imaged on the surface of the object 6. The microscope projects a correspondingly unsharp image both of the measuring diaphragm MB and of the object 6. At the detector diaphragm DB a correspondingly unsharp image MB″ of the measuring diaphragm MB then appears. A sharp image of the measuring diaphragm is obtained on the surface of the object 6 only if the object plane is on the focus plane F. Thus the image MB″ of the measuring diaphragm is then also sharp in the detector diaphragm and the autofocus signal AF of the detector 8 assumes the minimum value in the curve of FIG. 3. For the rest, the control of the drive 10 for the object holder 5′ corresponds to that in the embodiment of FIG. 1.

In order to always obtain the same autofocus signal AF even in different conditions of illumination of fluctuating reflectivities of the objects, the control device 9 according to FIG. 4 has a controllable analog amplifier 9a for the autofocus signal. The control signal, for example for changing the gain factor of the analog amplifier 9a, is generated by an analog or digital computer 9b which also generates the control signal for the drive 10. In this arrangement, the actual intensity is measured via a reference probe, not shown, in the intermediate image plane of the microscope and supplied as reference signal 9d to the amplifier 9a. The reference signal can also be derived directly from the detector 8 before focussing begins. The gain factor of the amlifier 9a is then set to a suitable value and kept constant during the focussing.

In connection with FIGS. 1 and 2, a masking measuring diaphragm MB and a detector diaphragm DB (which is complementary to the former) in the form of a hole diaphragm is described. These diaphragms can also be constructed, for example, as a unilateral diaphragm according to FIG. 5a (measuring diaphragm) and a unilateral detector diaphragm DB (FIG. 5b) which is complementary to the former. Instead of the detector diaphragm DB, two detectors $D_1$ and $D_2$ arranged at a small distance from each other, can be used to measure the contrast at the edge of a diaphragm image via a differential circuit 21. Accordingly, the measuring diaphragm is sharply imaged when contrast is greatest. Such an arrangement is shown in FIG. 5c.

Contrast measurements can also be carried out directly in the intermediate image without using the measuring diaphragm; however, this method fails with contrast-less surfaces, for example blank wafers.

According to FIG. 6, both radial and azimuthal diaphragms can be used but care must be taken that radial diaphragms are not too far from the optical axis in order to avoid chromatic aberrations which increase towards the lens edge. In contrast, azimuthal diaphragms do not have chromatic aberrations. FIG. 6 shows such an azimuthal measuring diaphragm MB and the corresponding detector diaphragm sections $DB_1$ and $DB_2$. In addition, the field of view 20 offered by the eyepiece diaphragm (hole diaphragm with a diameter of about 18 mm) is indicated.

As the automatic focussing according to the invention is carried out through the objective of the microscope, the focussing accuracy increases by as much as the depth of focus decreases so that regardless of the disjective, an adjusting accuracy is obtained which always corresponds to the depth of focus (this is the case in the incident - light method).

This focussing is also independent of the adjustment of the aperture diaphragm, of the conditions of illumination, and (if the measuring diaphragm is used) of the surface characteristics of the object. With increasing illumination aperture, the depth of focus decreases and thus the adjusting accuracy improves.

Compared with the transmitted-light method (see FIG. 1), the automatic focussing according to the invention also has the advantage that in the incident-light method (see FIG. 2) the intermediate image MB' is always in the focal plane of the microscope after the preliminary adjustment, regardless of the position and the thickness of the object. If the objective is exchanged, it is also not necessary to change the adjustment of the measuring diaphragm as the measuring diaphragm is first imaged by the objective onto the focus plane in accordance with its imaging scale of 1:m and is then imaged, magnitified by m:1, onto the plane of the detector diaphragm. The imaging scale of the objective thus has no effect on the position and size of the measuring diaphragm image MB'''. This corresponds to a "shortening out" of the magnifying scale.

I claim:

1. A device for the automatic focussing of optical instruments with an eyepiece, comprising
   (a) a measuring beam, which can be brought into the radiation path of the optical instrument, for illuminating the surface of an object,
   (b) a detector for determining the focussing accuracy of the optical instrument with respect to the surface of the object and comprising
   (c) a control device including a drive for adjusting the relative position of the object with respect to the focussing plane of the optical instrument by optimising an autofocus signal generated by the detector,
   wherein
   (d) a measuring diaphagm is imaged by the measuring beam into the radiation path of the optical instrument in such a manner that the nominal position of the diaphragm image is located on the plane of the object when focussed and
   (e) a detector diaphragm complementary to the measuring diaphragm and arranged in front of the detector is on the image plane, or an optical equivalent, of the optical instrument, the detector providing an output autofocus signal to the control device to move the drive for focussing movement between the object/measuring diaphragm and the optical instrument.

2. A device according to claim 1, wherein the measuring diaphragm is laterally offset with respect to the optical axis of the optical instrument.

3. A device according to claim 2, wherein the offset of the measuring diaphragm in the eyepiece is of such a magnitude that the diaphragm image is outside the field of view.

4. A device according to claim 1, in which a beam splitter is positioned in the radiation path of the optical instrument between the objective lens and the eyepiece, for decoupling the measuring beam from the main radiation path.

5. A device according to claim 1, in which the optical instrument is operated with an illuminating beam of transmitted light, wherein
   (a) the measuring beam is essentially parallel to the illuminating beam,
   (b) the measuring diaphragm lies in the beam path in front of a condenser, the latter being in front of the object holder, and
   (c) the image of the measuring diaphragm is preset onto the object plane of the object holder.

6. A device according to claim 5, in which the object holder is movable in the direction of the optical axis and relative to the focus plane, this being a joint movement together with the object, the condenser lens and the measuring diaphragm of the optical instrument.

7. A device according to claim 1, in which the optical instrument is operated with incident light, wherein the measuring beam is reflected in the beam direction behind the objective lens onto the radiation path of the optical instrument and is imaged through the objective lens onto the focus plane of the optical instrument.

8. A device according to claim 7, wherein the object holder is movable together with the object in the direction of the optical axis of the optical instrument, relative to the focus plane.

9. A device according to claim 1, wherein the measuring diaphragm is a hole diaphragm or a masking diaphragm and the detector diaphragm is a masking or hole diaphragm which is complementary to the former.

10. A device according to claim 1, wherein the measuring diaphragm is a unilateral diaphragm.

11. A device according to claim 10, wherein the detector diaphragm is a unilateral diaphragm complementary to the measuring diaphragm.

12. A device according to claim 1, wherein the measuring diaphragm is a diaphragm which is azimuthal with respect to the field of view and the detector diaphragm is provided with two complementary diaphragm sections arranged with azimuthal spacing.

13. A device according to claim 1, including several measuring diaphragms and several complementary detector diaphragms with corresponding detectors.

14. A device according to claim 1, wherein several detector diaphragms and their corresponding detectors are arranged in different image planes.

15. A device according to claim 1, wherein a control device which controls the adjusting movement has a controllable amplifier which amplifies the autofocus signal, and an analog or digital computer for further processing the amplified autofocus signal and for generating the adjusting signal for the drive.

16. A device according to claim 15, wherein the computer generates a control signal for the amplifier.

17. A device according to claim 1, wherein a reference probe in the intermediate image plane of the optical instrument generates a reference signal for the amplifier.

18. A device according to claim 1, wherein at least two detectors measuring the image contrast of the measuring diaphragm are provided in the image plane.

19. A device according to claim 3, in which a beam splitter is positioned in the radiation path of the optical instrument between the objective lens and the eyepiece for decoupling the measuring beam from the main radiation path.

20. A device according to claim 3, in which the optical instrument is operated with an illuminating beam of transmitted light, wherein
   (a) the measuring beam essentially runs parallel to the illuminating beam,
   (b) the measuring diaphragm is arranged in the beam direction in front of a condenser and the latter is arranged in front of the object holder, and
   (c) the image of the measuring diaphragm is preset into the object plane of the object holder.

21. A device according to claim 20, in which the object holder is movable together with the object, the condenser lens and the measuring diaphragm relative to the focus plane of the optical instrument in the direction of the optical axis.

22. A device according to claim 19, in which the optical instrument is operated with incident light, wherein the measuring beam is reflected in the beam direction behind the objective lens into the radiation path of the optical instrument and is imaged through the objective lens onto the focus plane of the optical instrument.

23. A device according to claim 22, wherein the object holder is movable together with the object in the direction of the optical axis of the optical instrument, relative to the focus plane.

24. A device according to claim 20, wherein the control device adjusts the relative position of the object with respect to the focussing plane of the optical instrument by seeking the minimum value of the autofocus signal.

25. A device for the automatic focussing of optical instruments and particularly of microscopes, comprising
(a) a measuring beam, which can be brought into the radiation path of the optical instrument, for illuminating the surface of an object,
(b) a detector for determining the accuracy of focussing of the optical instrument with respect to the surface of the object and comprising
(c) a control device including a drive for adjusting the relative position of the object with respect to the focussing plane of the optical instrument by optimising an autofocus signal generated by the detector, wherein
(d) a measuring diaphragm is imaged, by the measuring beam, into the radiation path of the optical instrument in such a manner that the nominal position of the diaphragm image is located in the plane of the image plane when focussed and
(e) in the image plane of the optical instrument or in a plane which is optically equivalent to the former plane at least two detectors are provided for measuring the image contrast of the measuring diaphragm, the detector providing an output autofocus signal to the control device to move the drive for focussing movement between the object-/measuring diaphragm and the optical instrument.

26. A device according to claim 25, wherein
(a) one of said detectors is positioned at the location of the image of the measuring diaphragm when the optical instrument is focussed,
(b) the other of said detectors is positioned away from said location, and
(c) the control device adjusts the relative position of the object with respect to the focussing plane by seeking the maximum difference in contrast.

* * * * *